W. GRÖSSLER.
Bench-Plane.
No. 196,444. Patented Oct. 23, 1877.
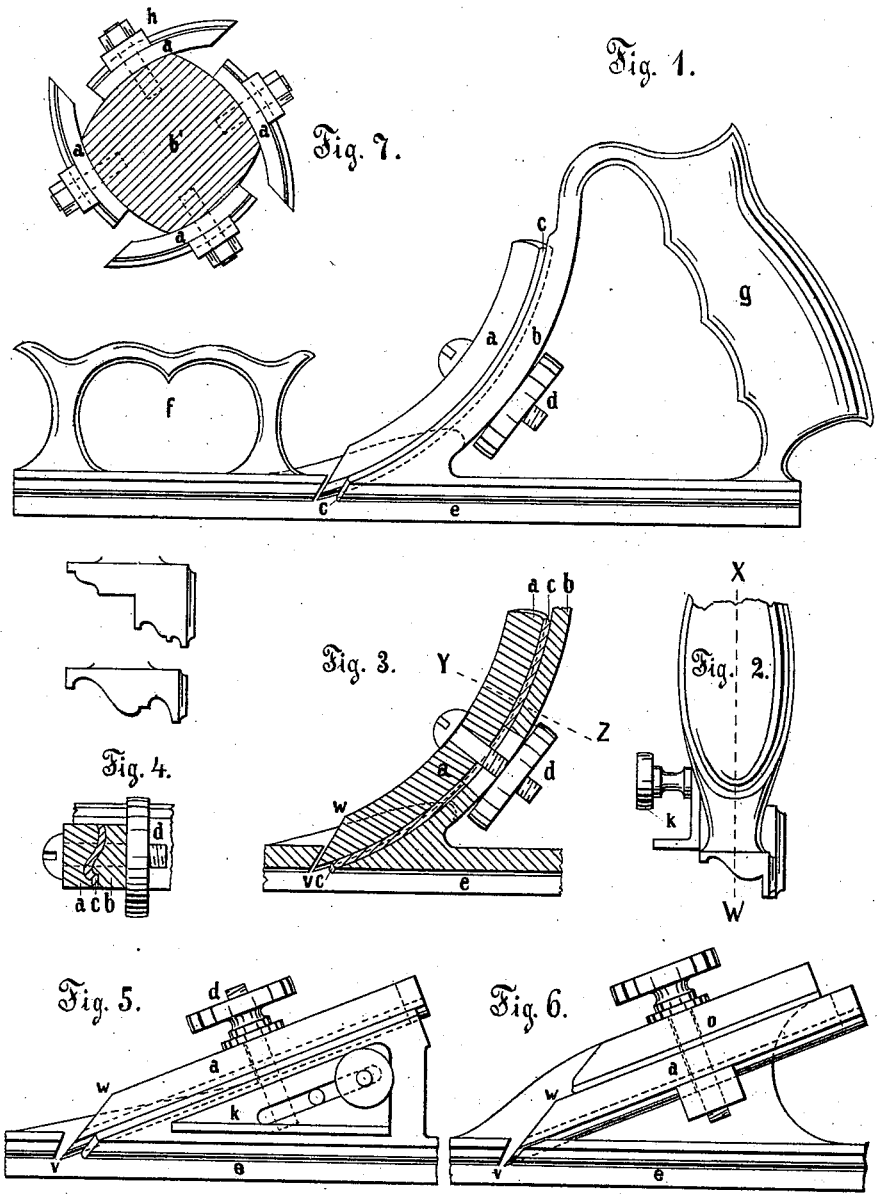

UNITED STATES PATENT OFFICE.

WILHELM GRÖSSLER, OF RUISSEINA, NEAR NOSSEN, SAXONY, ASSIGNOR TO CARL PIEPER, OF DRESDEN, GERMANY.

IMPROVEMENT IN BENCH-PLANES.

Specification forming part of Letters Patent No. 196,444, dated October 23, 1877; application filed October 15, 1877.

*To all whom it may concern:*

Be it known that I, WILHELM GRÖSSLER, of Ruisseina, near Nossen, in the Kingdom of Saxony, have invented a new Cornice-Plane, of which the following is a specification:

This invention consists in constructing the irons of molding, cornice, and similar planes, as well as the cutters of wood-planing machines, in such a manner that they may be sharpened upon common grinding-surfaces, whereby filing or otherwise trimming the molded surface at the cutting-edge is avoided.

A molding-plane provided with my improved iron is illustrated in the drawings, Figure 1 illustrating a side elevation of the same; Fig. 2, a part right-hand end view; Fig. 3, a part longitudinal section, and Fig. 4 a cross-section on line Y Z of Fig. 3. Figs. 5 and 6 illustrate modified forms of the invention; and Fig. 7 represents cutters constructed according to this improvement, and applied to the tool-holder of a wood-planing machine.

The plane-iron $a$ may be curved, as shown in Figs. 1 and 3, or straight, as represented in Figs. 5 and 6. It is molded throughout the length of its back surface, as is shown in the sectional view, Fig. 4; but, if preferred, this molding may extend along a part only of the back surface.

The body or stock is, by preference, to be made of metal, although wood or other suitable material may be used, and the iron fastened to the part $b$ of the stock by a screw-bolt, $d$, passing through a slot in said part $b$, and provided with a fastening-nut, having a milled edge, or in any other suitable manner.

The part $b$ must correspond along its face or outer side with the molded surface of the iron, and a strip of cloth or other suitable material, $c$, should be placed under the iron, for the purpose of increasing the friction of the same, and to prevent the iron from shifting. This strip of cloth may be glued to the part $b$.

The iron must be molded on its back surface in such a shape that, after being ground at the end to the proper bevel and fixed in position, its cutting-edge will correspond to the molded face $e$ of the plane.

The curved form affords great facilities in manufacturing the irons, since they may be turned in a lathe in a large ring, which is subsequently cut into pieces; but, if preferred, these irons may be made straight, as in Figs. 5 and 6.

In the modification, Fig. 5, the screw $d$ is fixed in the body of the plane, and the iron has a slit in it to provide for its adjustment.

In the modification, Fig. 6, a straight iron has its flat upper surface fixed to the under side of a plate, $o$, projecting from a side wall of the plane-stock, whereby contact of the molded back surface of the iron with its support is avoided.

The beveled end surface V W, Figs. 3, 5, and 6, which is, by preference, flat, so that it may be ground on any common grindstone, is turned or faced upward and toward the front or leading end of the plane, while heretofore it has commonly been turned or faced the other way. This beveled surface should be inclined to the face of the plane at the same angle at which the body of the irons in common planes is inclined, while the angle of inclination of the molded back surface at the cutting-edge has in general to agree with that of the bevel of the common irons.

The handles $f$ and $g$ of the plane represented in Fig. 1 may be modified in various ways; but considering the number and variety of molding-planes required in a joiner's shop, I regard it advantageous to make the bottom part, which has the molded face $e$, in one piece with the part $b$, and to have a separate piece provided with the handles $f$ and $g$, adapted to fit all the main pieces in such a manner that it may be readily fixed to any one of them.

For the purpose of enabling the user to plane a number of moldings to exactly the same depth, an adjustable stop, $k$, Figs. 2 and 5, may be screwed laterally to the stock of the plane, thereby forming a gage, limiting the depth of the cut.

These improved plane-irons may be applied to molding-planes of all descriptions—such as grooving, tonguing, rabbeting, and similar planes, as well as to ordinary planes with flat faces. They may also be used for machine-planing, as shown in Fig. 7, which illustrates the section of a rotating tool-holder of a wood-planing machine fitted with the improved cutters *a a*. These are molded on the back surface or outside in the same manner as stated above. For fixing them to the holder *b'*, a washer, *h*, molded to correspond to the cutter, is placed under the nut of the fastening-screw.

What is claimed is—

1. A plane iron or cutter molded on the back part or surface to the desired pattern throughout the whole or a part of its length, and being flat on its upper surface, in combination with a plane-stock or tool-holder shaped to fit the molded side of the iron, all substantially as and for the purpose set forth.

2. The combination of a plane iron or cutter, a plane-stock or tool-holder, and an interposed strip of fabric, substantially as and for the purpose set forth.

In testimony whereof I have signed my name to this specification in the presence of two subscribing witnesses.

WILHELM GRÖSSLER.

Witnesses:
ERASMUS PAUL,
MAXIMILIAN SCHÖNE.